United States Patent [19]

Quarve et al.

[11] Patent Number: 4,848,164
[45] Date of Patent: Jul. 18, 1989

[54] LIQUID FLOW METER

[75] Inventors: Vernon Quarve, Minneapolis; Dennis McCormick, Mendota Heights; Robert A. Kimber, Minneapolis, all of Minn.

[73] Assignee: Graco Inc., Minneapolis, Minn.

[21] Appl. No.: 199,433

[22] Filed: May 27, 1988

[51] Int. Cl.⁴ ............................................. G01F 3/00
[52] U.S. Cl. .................................. 73/861.77; 73/253
[58] Field of Search ...................... 73/253, 261, 861.77

[56] References Cited

U.S. PATENT DOCUMENTS

| | | |
|---|---|---|
| 2,683,224 | 7/1954 | Cole . |
| 2,988,916 | 6/1961 | Waugh . |
| 3,069,907 | 12/1962 | Eddy ............................ 73/861.77 |
| 3,780,579 | 12/1973 | Barnard ........................ 73/861.77 |
| 4,101,874 | 7/1978 | Denison et al. . |
| 4,140,013 | 2/1979 | Hunger ......................... 73/861.77 |
| 4,253,341 | 3/1981 | Ikeda et al. . |
| 4,275,291 | 1/1981 | Feller . |
| 4,306,457 | 12/1981 | Fukui et al. . |
| 4,308,755 | 1/1982 | Millar et al. ................... 73/861.77 |
| 4,337,655 | 7/1982 | Sundstrom ..................... 73/861.77 |
| 4,389,902 | 6/1982 | Kataoka et al. . |
| 4,553,433 | 11/1985 | Hicks . |
| 4,571,995 | 2/1986 | Timme . |

Primary Examiner—Herbert Goldstein
Attorney, Agent, or Firm—Paul L. Sjoquist

[57] ABSTRACT

A liquid flow meter of the type having a positive displacement rotatable member responsive to liquid flow, with a permanent magnet affixed to the rotatable member. A magnetically-operable reed switch is located proximate the reed switch, but outside the liquid flow housing, and battery-operated circuits accumulate counts of reed switch closures, and display the counts in units representative of liquid flow volumes.

18 Claims, 4 Drawing Sheets

LIQUID FLOW METER

BACKGROUND OF THE INVENTION

The present invention relates to a liquid flow meter, including an electronic, battery-operated circuit for providing a visual indication of liquid flow volume. The invention is uniquely adaptable for providing liquid flow readouts in any of a plurality of measurement units.

Conventional liquid flow meters typically comprise an impeller or turbine sealably mounted in a liquid flow path, wherein the number of rotations of the impeller or turbine provide a measure of the liquid flow volume therethrough. Some liquid flow meters utilize mechanical gear linkages coupled to the rotatable member, and coupled to one or more rotatable dials to provide an indication of flow volume. Other liquid flow meters provide an electrical circuit for detecting the rotation of movement of the impeller or turbine, wherein it is typical to connect a magnetic element to the rotatable shaft and to provide a coil or inductive pickup circuit in proximity to the magnet, wherein the rotating magnet generates varying magnetic fields to influence the circuitry coupled to the pickup, and to thereby generate electrical signals representative of shaft rotation. The electrical signals are subsequently amplified and converted to drive signals for energizing some form of indicating device.

U.S. Pat. No. 4,306,457, issued Dec. 22, 1981, illustrates one form of liquid flow meter, wherein a magnet is affixed to the rotatable impeller shaft. A magnetic field sensor, in the form of a ferromagneto resistive circuit, is placed in physical proximity to the rotatable magnet, and the magnetic field induces an electrical signal in the sensor, which signal is amplified and shaped to drive a suitable logic network, the logic network serving to both count the sensed signals and to calculate a corresponding flow volume indication, and to drive an appropriate indicator which displays the calculated flow volume.

Another form of flow meter utilizing magnets is disclosed in U.S. Pat. No. 4,275,291, issued June 23, 1981. This patent discloses a first magnet which is affixed to the rotatable impeller shaft, and a second magnet which is placed in proximity to the first magnet, but outside of the liquid flow chamber. Rotation of the second magnet is induced by the rotating field of the first magnet, and the rotating field generated by the second magnet is detected by an inductive sensor to generate an electrical signal representative of the shaft rotation. The electrical signal is then utilized to drive an indicator circuit to provide a readout of the volume flow detected by the device.

Still another form of flow meter utilizing shaft-mounted magnets is illustrated in U.S. Pat. No. 4,553,433, issued Nov. 19, 1985. This patent discloses a gas meter having a first magnet attached to a rotor shaft and a second magnet attached to an indicator shaft, the second magnet being rotatably and magnetically coupled to the first magnet, so as to provide corresponding rotation of the indicator shaft when the rotor shaft is rotated by the flow of fluid through the meter housing. In this manner, a mechanical indicator movement may be driven by magnetic coupling to the flow meter shaft.

SUMMARY OF THE INVENTION

The present invention comprises a liquid flow meter of the rotating turbine or impeller type, wherein liquid flow through the meter results in positive rotatable displacement of a shaft made from a nonmagnetic material. A permanent magnet is embedded proximate one end of the shaft, and the impeller end shaft is rotatably mounted in a housing made from nonmagnetic materials. A magnetically-operated reed switch is positioned outside the housing proximate the shaft end embedding the permanent magnet, and each complete revolution of the shaft causes two magnetically-induced closures of the reed switch. The reed switch is electrically coupled to a battery-operated logic circuit, including counters and an electronic visual display, so that switch closures of the reed switch are converted into flow volume display indications.

The internal design of the rotatable impeller and flow meter cavity are controlled to provide predetermined volumetric displacement characteristics, wherein each revolution of the impeller is matched to the logic circuit so as to provide a predetermined fractional relationship between the liquid flow volume passed during a single revolution of the shaft and the unit of measure in which the logic circuit and display are adapted to count and display units. The unit of measurement which is displayed on the visual indicator may therefore be modified by merely changing one linear dimension of the rotatable turbine or impeller.

It is a feature of the present invention to provide a positive displacement liquid flow meter with an electronic digital display which permits visual readout in any of a number of different measurement units.

It is a further feature of the present invention wherein a positive displacement liquid flow meter uses a mechanically-operated magnetic sensor to minimize the adverse effects of extraneous electrical disturbances.

It is a principal object of the present invention to provide a positive displacement liquid flow meter which is wholly self-contained and battery operated, and which may be readily converted from one unit of measurement to another.

BRIEF DESCRIPTION OF THE DRAWINGS

The foregoing features and objects of the invention will become apparent from the following specification and claims, and with reference to the appended drawings, in which:

DESCRIPTION OF THE PREFERRED EMBODIMENT

Figure 1:
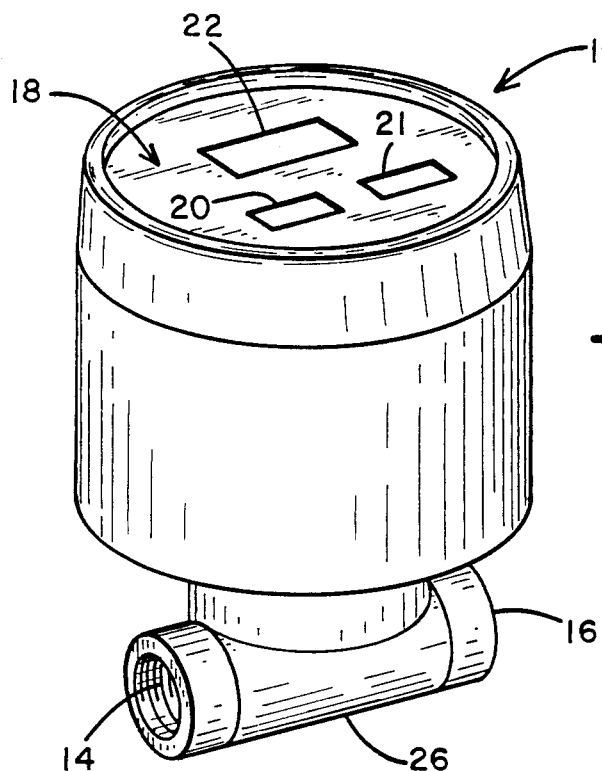
FIG. 1 shows an isometric view of the invention.

Referring first to FIG. 1, liquid flow meter 10 is shown in isometric view. A meter housing cover 12 is removably attached over an upper housing, an intermediate housing, and a lower housing 26. Lower housing 26 has an inlet port 14 and an outlet port 16, which are reversible, and are adaptable for coupling into a liquid flow line. A meter face 18 forms a part of the upper housing, and has two pressure-sensitive switches 20 and 21, and a visual display indicator 22. The pressure-sensitive switches 20 and 21 may be activated by operator touch control and will be more fully described hereinafter.

Figure 2:
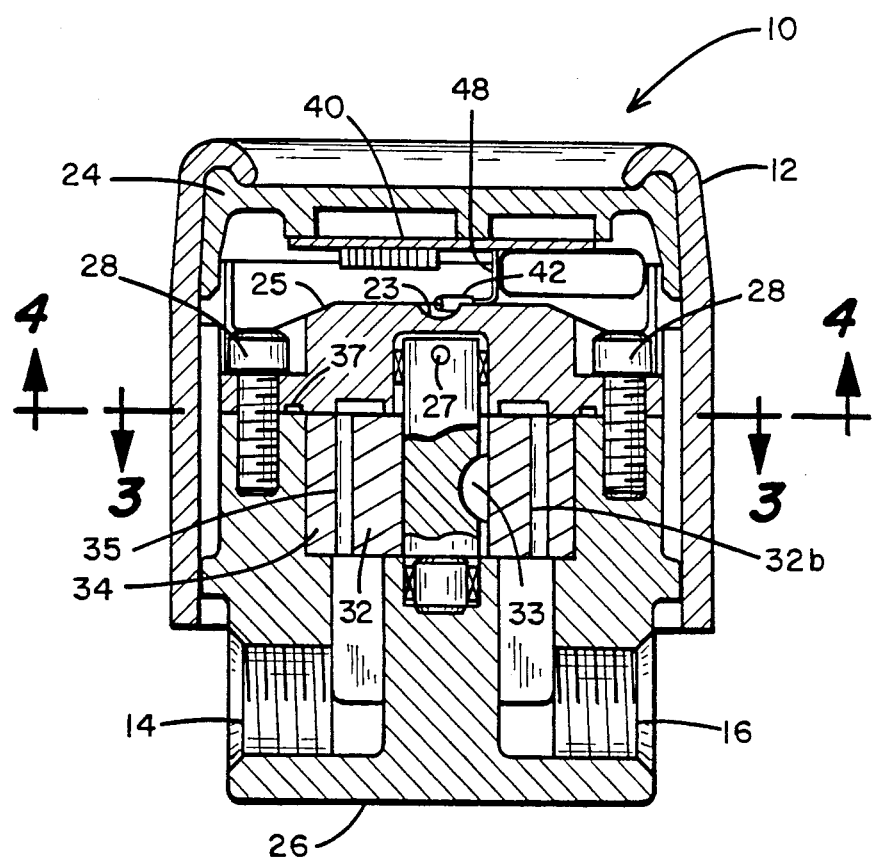
FIG. 2 shows an elevational cross-sectional view of the invention.

FIG. 2 shows an elevational cross-sectional view of liquid flow meter 10. Lower housing 26 and intermediate housing 25 are preferably constructed of nonmagnetic metallic material, as for example aluminum or stainless steel. Upper housing 24 is preferably constructed from a plastic material, and portions of upper housing 24 may be made translucent so as to provide operator visibility to indicator 22.

Intermediate housing 25 is sealably affixed to lower housing 26 by a plurality of fasteners 28. A shaft 30 is rotatably mounted in suitable bearings, one end of shaft 30 being held within an opening in intermediate housing 25, and the other end of shaft 30 being held in an opening in lower housing 26. An impeller 32 is affixed to shaft 30 by a key 33, and impeller 32 is sized for rotatable mounting within a recess in lower housing 26. A freely-rotatable stator 34 is also mounted in the recess in lower housing 26, as will be described in more detail hereinafter.

An electronic circuit board 40 is affixed to upper housing 24, and circuit board 40 contains all of the electrical components associated with the present invention. A reed switch 42 is connected to circuit board 40, through electrical leads 47 and 48 which are formed so as to space reed switch 42 away from circuit board 40 and into a recess 23 formed in intermediate housing 25. A permanent magnet 27 is embedded in shaft 30 proximate the upper end thereof, and the spacing between permanent magnet 27 and reed switch 42 is controlled so as to bring the switching elements in reed switch 42 under the influence of the magnetic field generated by permanent magnet 27. As permanent magnet 27 rotates within shaft 30, the switching elements of reed switch 42 are drawn together twice during each revolution of shaft 30.

Figure 3:
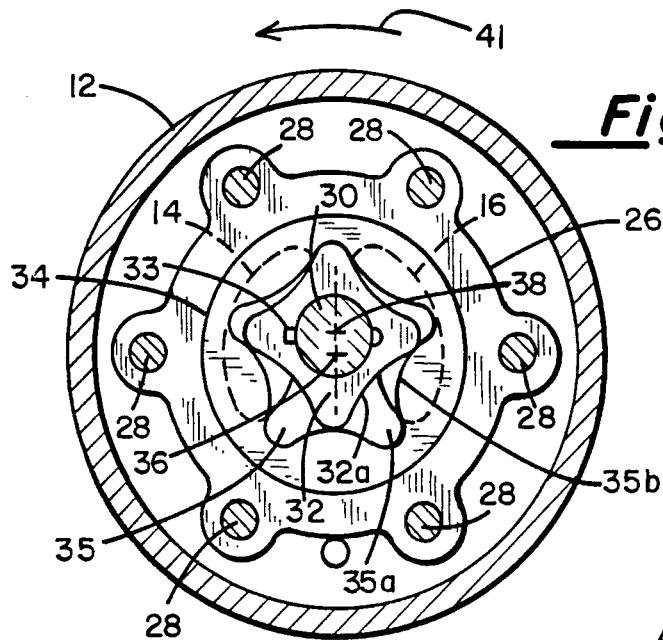
FIG. 3 shows a cross-sectional view taken along the lines 3—3 of FIG. 2.

FIG. 3 shows a cross-sectional view taken along the lines 3—3 of FIG. 2. A cylindrical recess in lower housing 26 is sized to accept stator 34. Stator 34 is dimensioned so as to freely rotate within this cylindrical recess, without providing any significant leakage path for liquid flowing through flow meter 10. Stator 34 is symmetrically mounted about center point 36, whereas shaft 30 is mounted about center point 38, slightly offset from center point 36. Impeller 32 is affixed to shaft 30 by means of key 33, and therefore rotates about shaft center 38.

Liquid which enters the flow meter through inlet 14 fills a selected portion of cavity 35, causing rotation of stator 34 and impeller 32, in the direction indicated by arrow 41, and the liquid trapped within the portion of cavity 35 is ultimately delivered to outlet 16. In the preferred embodiment impeller 32 is designed having four cusps, and therefore the liquid volume defined between any two of these cusps is passed from inlet 14 to outlet 16 during each one-fourth revolution of shaft 30.

The maximum volume of such liquid transfer can be readily calculated upon examination of FIG. 3, specifically referring to cavity 35a. Cavity 35a is defined by the boundaries of impeller 32 between two adjacent cusps, and by the interior surface of stator 34 bridging these cusps, and by the length of impeller 32 and stator 34. A calculation of this volume is made as follows: first, the cross-sectional area of cavity 35a may be determined by calculating the area between line segment 32a forming the outer surface between two cusps of impeller 32, and the curved line 35b, forming the interior surface of cavity 35a between two adjacent cusps of impeller 32. This calculation yields the cross-sectional area of cavity 35a. Next, referring to FIG. 2, measure the length of line 32b, forming the length dimension of impeller 32. Finally, multiply the length of line 32b times the area calculated above, to determine the volume of cavity 35a. It is to be appreciated that the volume of cavity 35a may be modified by merely increasing or decreasing the length 32b of impeller 32, and the corresponding length of stator 34. In this manner, the volume delivery per revolution of flow meter 10 may be preselected to accommodate any unit of measurement, as for example pints, quarts, gallons, or liters.

Figure 4:
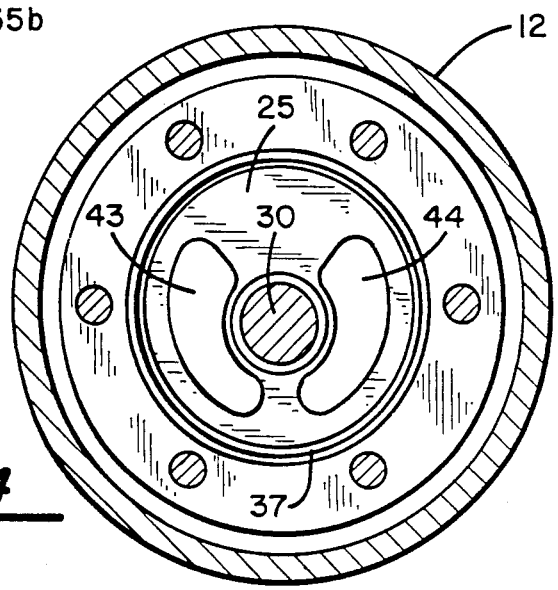
FIG. 4 shows a cross-sectional view taken along the lines 4—4 of FIG. 2.

FIG. 4 shows a cross-sectional view taken along the lines 4—4 of FIG. 2. This shows the lower surface of intermediate housing 25, including a sealing O-ring 37. O-ring 37 forms a seal between intermediate housing 25 and lower housing 26 when the units are assembled together. A pair of curved recesses 43 and 44 are provided in the undersurface of housing 25, in order to equalize liquid pressure across the respective cavities during the operation of flow meter 10.

Figure 5A:
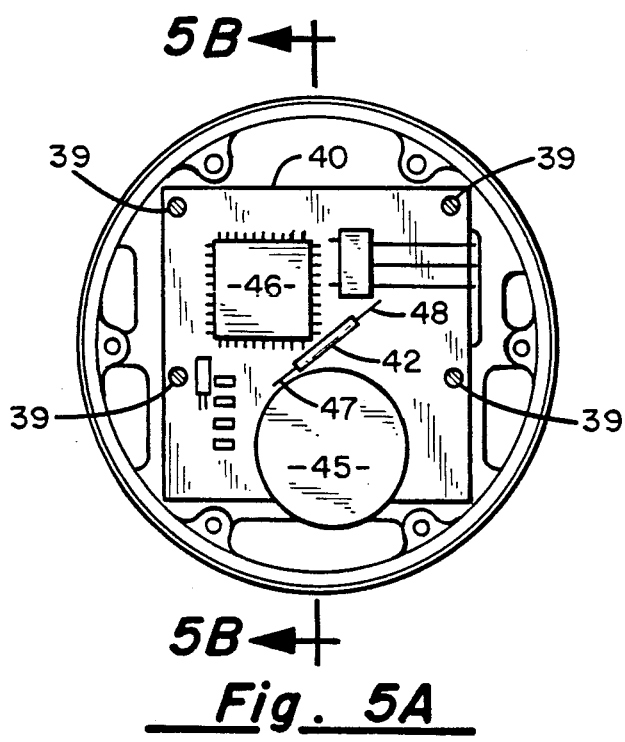
FIG. 5A shows a bottom view of the upper housing.
Figure 5B:
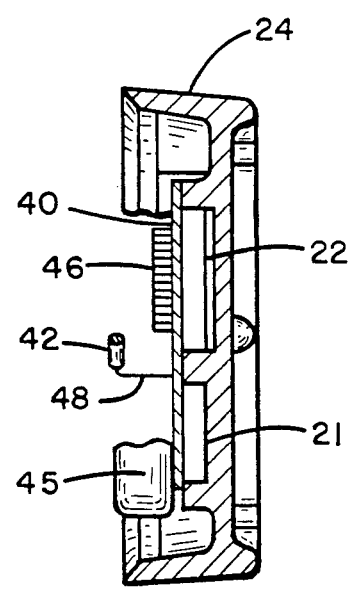
FIG. 5B shows a cross-sectional view taken along the lines 5B—5B of FIG. 5A.

FIG. 5A shows a bottom view of upper housing 24, including circuit board 40, which is affixed to upper housing 24 by fasteners 39. Circuit board 40 holds the electronic components required for operation of the invention affixed thereto, including a battery 45 and a logic circuit 46. Reed switch 42 is affixed to circuit board 40, in spaced-apart relationship, as is shown in FIG. 5B. FIG. 5B shows a cross section taken along the lines 5B—5B of FIG. 5A. Logic circuit 46 is connected to indicator 22, and provides the necessary electronic signals to drive a visual digital display. Other circuits are connected to pressure switches 20 and 21, which are mounted along the top surface of circuit board 40.

Figure 6:
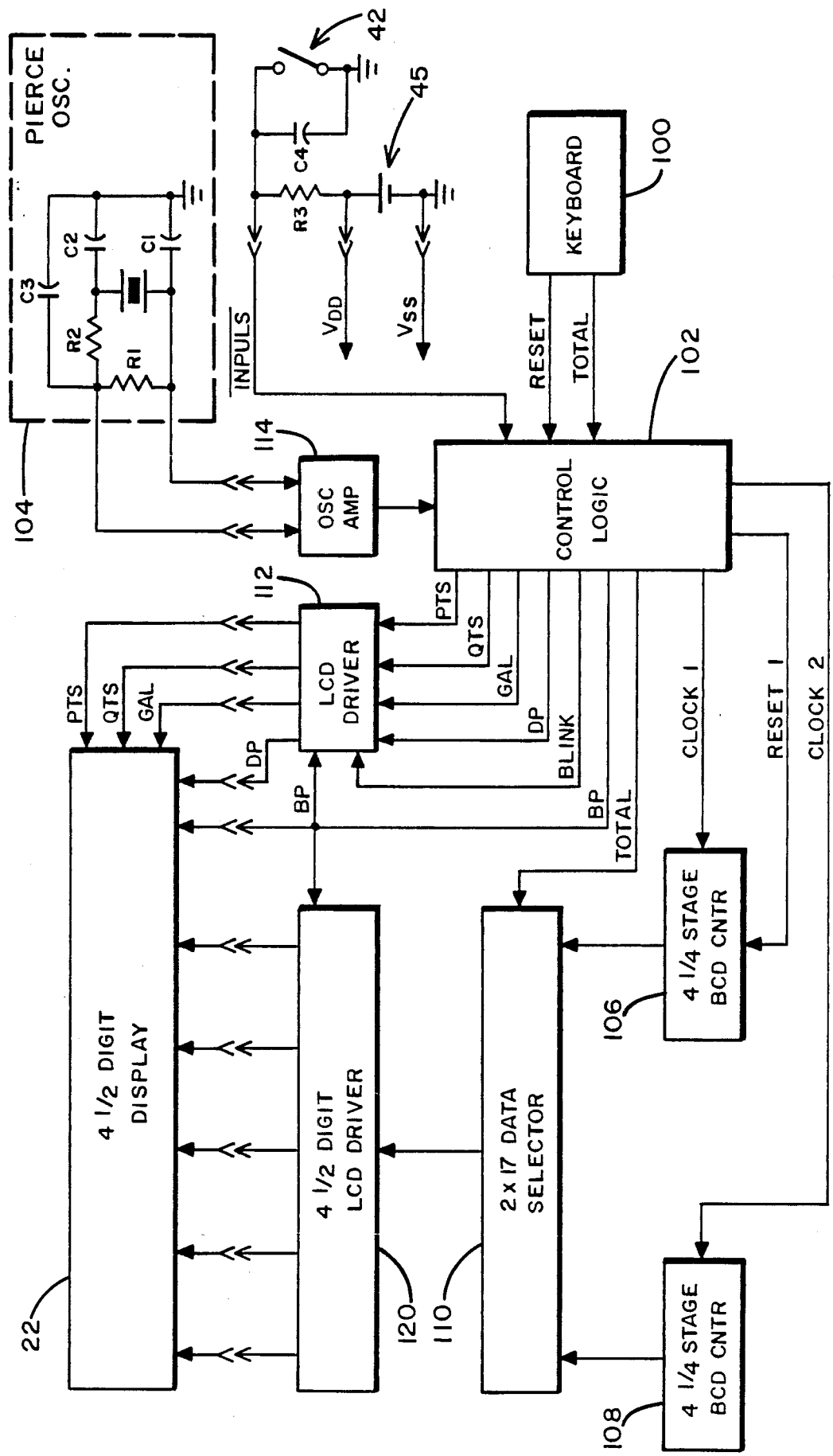
FIG. 6 shows a functional block diagram of the electronic circuitry of the invention.

FIG. 6 shows a functional block diagram of the electronic circuits associated with the present invention. Battery 45 is preferably a 3.6 volt lithium battery, Type QTC85, manufactured by Electrochem. Battery 45 provides the operating voltage for all of the circuits required in the invention. Because of the extremely low power drain of the circuits associated with the invention, battery 45 may provide sufficient power to operate these circuits for the entire useful life of the flow meter.

Reed switch 42 is electrically connected to a resistor-capacitor circuit to provide signal conditioning during the operation of the reed switch. The signal generated by each closure of reed switch 42 is coupled to control logic 102 as an input drive signal, which has a built-in delay circuit to contact bounce of the reed switch closure for 200 microseconds.

Circuit 104 utilizes a watch crystal and associated components, connected to amplifier 114 to form a Pierce oscillator. The signals from circuit 104 and amplifier 114 are used to control the timing of all of the logic circuits in the invention. The crystal oscillator frequency is preferably selected to be about 30 kilohertz (khz) for satisfactory circuit operation.

Switches 20 and 21 form a part of keyboard 100. Keyboard 100 senses switch closures and generates output signals corresponding to the switch closures sensed. Since there are two switches 20 and 21, the keyboard is designed to activate the output signal line "reset" if switch 21 is depressed and released; to activate the output signal line "total" if the switch 20 is depressed and released. Control logic 102 has a built-in time-delay circuit to ignore contact bounce from switches 20 and 21 for a period of 25 milliseconds after either of the switches is first detected to be closed.

Control logic 102 receives control signal inputs from oscillator amplifier 114, reed switch 42, and keyboard 100, and generates all necessary logic control signals as a result of these input signals. If the "reset" line is activated by keyboard 100, control logic 102 generates a "reset 1" signal to counter 106, thereby initializing the count values prestored in this counter. If the "total" line is activated by keyboard 100, control logic 102 will then gate the count held in BCD counter 108 into the LCD driver circuits 120. If the "total" line is not active, control logic 102 gates the count held by BCD batch counter 106 into the LCD driver circuits 120.

Control logic 102 is also designed to interpret particular sequences of operation of switches 20 and 21, so as to activate particular output lines from control logic 102. For example, control logic 102 senses the length of time in which the "reset" switch is depressed, and if the time exceeds two seconds control logic 102 activates the output "blink" line. This line is connected to the LCD driver 112, and causes the annunciator display to blink on and off at a predetermined rate. If the "reset" switch is held down for at least two seconds, and the "total" switch is then depressed and released, control logic 102 will sequentially activate one of the three annunciator output lines labeled "GAL," "QTS," and/or "PTS." Control logic 102 is designed to select each of these three output lines in sequential order, incrementing the sequence each time the above-identified sequence of key depressions occurs. The three output lines "GAL," "QTS," and "PTS," are each connected to LCD driver circuits 112, which in turn is coupled to digital display indicator 22. Each of these lines will activate a predetermined annunciator display image, as for example "PTS," "QTS," or "GAL." These display indicators provide a visual display to the operator to indicate that the decimal number displayed on visual display indicator 22 is associated with either the "pints," "quarts," or "gallons" unit of measurement.

Display 22 is preferably formed of a liquid crystal display device, as for example similar to a Type 3938, manufactured by Hamlin. This display is modified to the extent of adding the annunciator display capability.

Figure 7:
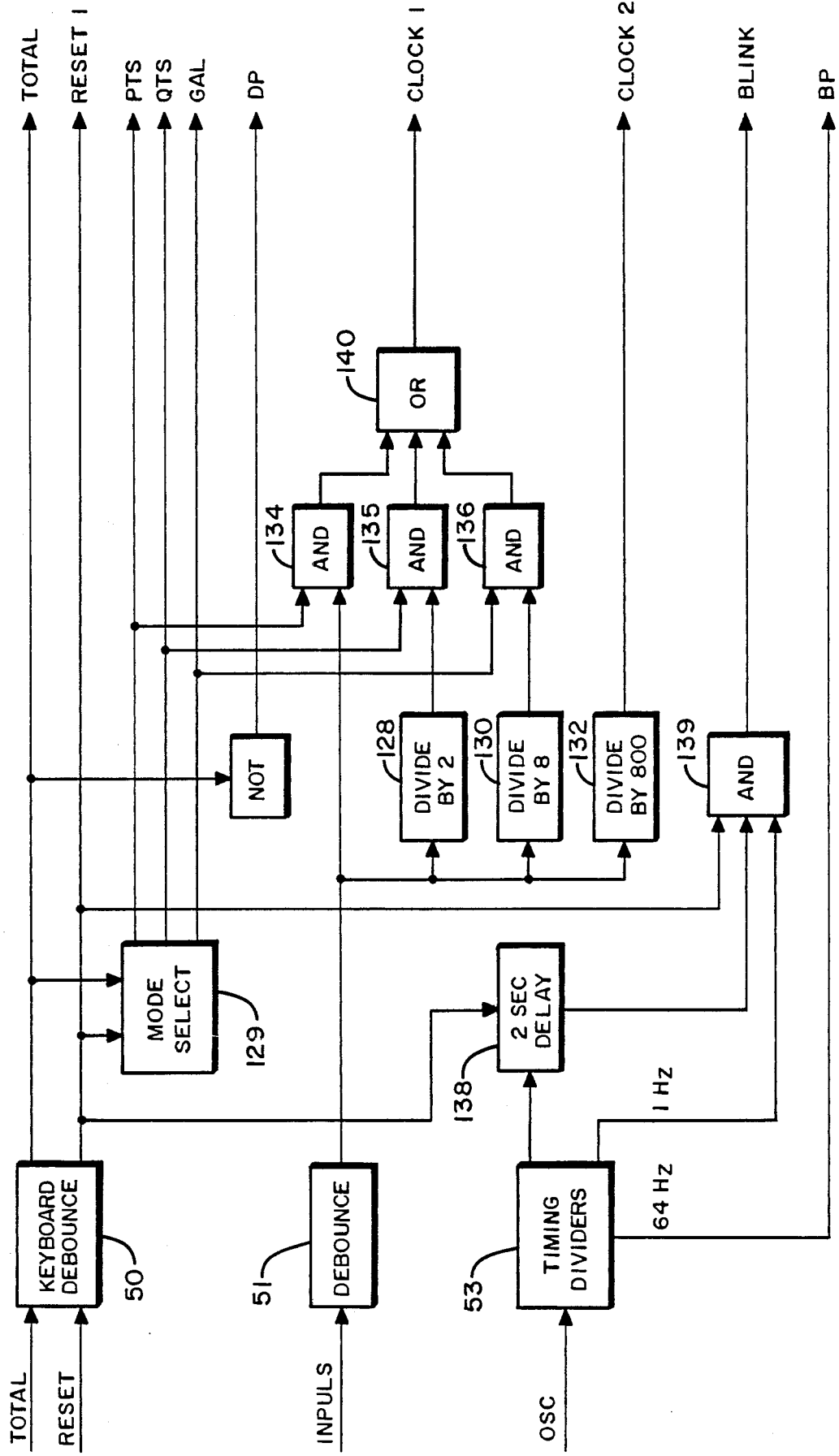
FIG. 7 shows a functional block diagram of the control logic of the invention.

FIG. 7 shows a symbolic block diagram of control logic 102. Control logic 102 may be entirely formed from a customized gate array logic circuit, according to techniques which are well known in practice. At the time of manufacture, all of the counters and logic circuits are initialized to clear all counters and place the circuits into an operational mode. The signal lines "reset" and "total" from keyboard 100 are coupled into a keyboard debounce circuit 50, which utilizes a 25 millisecond time delay to filter out switch contact bounce. The signal from reed switch 42 is designated by the signal name "inpuls," and is coupled into a debounce circuit 51. Circuit 51 utilizes a 200 microsecond time delay to filter out any switch contact bounce from reed switch 42. The signal from oscillator amplifier 114 is designated as "OSC," and is coupled into a timing divider circuit 53. Divider circuit 53 utilizes a counter circuit to divide the oscillator signal, preferably providing a 1 hertz (hz) output timing signal and a 64 hertz (hz) output timing signal. The 64 hz timing signal is identified as the "BP" signal on FIG. 6. The 1 hz signal is utilized as a timing and gating signal within control logic 102.

Reed switch signals, designated "inpuls" signals, are coupled to three divider circuits 128, 130 and 132. Divider circuit 128 is a counter which permits every second "inpuls" signal to pass; divider circuit 130 is a counter which permits every eighth "inpuls" signal to pass; divider circuit 132 is a counter which permits every eight hundredth "inpuls" signal to pass. The "inpuls" signal is also coupled to AND gate 134; the output from divider 128 is coupled to AND gate 135; the output from divider circuit 130 is coupled to AND gate 136. Each of these AND gates is conditioned by a second signal line, derived from the "mode select" circuit 129. The "mode select" circuit 129 has three outputs which may be sequentially activated by the "total" and "reset" switches, as described earlier. If the "PTS" output signal line is activated, then AND gate 134 will permit each "inpuls" signal from circuit 51 to be gated into OR circuit 140, to create the signal identified as "clock 1." The "clock 1" signal is utilized to increment the BCD counter 106, to thereby record each "inpuls" signal as an incremental fraction of the "pints" measurement.

If the "QTS" signal line from the mode select circuit 129 is active, it will cause AND gate 135 to become enabled, thereby permitting every second "inpuls" signal to be gated into OR gate 140, to thereby generate the "clock 1" signal. Since the "clock 1" signal increments the BCD counter 106, in this example the counter becomes incremented to record a fractional measurement relating to quarts. In other words, the BCD counter 106 will count "inpuls" signal at exactly one-half the rate as are counted when the "PTS" signal line is active.

When the "GAL" signal line is activated from mode circuit 129, it is coupled to AND gate 136, to thereby enable AND gate 136 to pass signals from the divider circuit 130. In this example, the signals from divider circuit 130 represent every eighth "inpuls" signal from reed switch 42, and therefore every eighth "inpuls" signal is gated to OR gate 140 to generate a "clock 1" signal. In this example, BCD counter 106 is incremented to count functional units of measure which are representative of gallons.

A further signal line from debounce circuit 51 is also coupled to divider circuit 132, which generates an output signal after each eight hundredth "inpuls" signals have been received from reed switch 42. The output from divider 132 is designated the "clock 2" signal, which is used to increment the BCD counter 108. BCD counter 108 therefore stores a count value representative of whole gallons. BCD counter 108 continually accumulates a count of the number of gallons which pass through the flow meter, and this counter is never reset throughout the operational life of the flow meter.

Either the contents of BCD counter 106, or the contents of BCD counter 108, are gated into data selector logic 110 by the presence or absence of a "total" signal. If the "total" signal is not present, then the contents of BCD counter 106 are gated into the data selector logic 110. If the "total" signal is present, then the contents of BCD counter 108 are gated into data selector logic 110. In either event, the output of data selector 110 is gated into LCD driver circuit 120, which in turn is connected to drive the digital display 22. Digital display 22 is arranged to provide a digital display indication of the contents of whichever BCD counter is gated into it. However, in the event that the "total" signal is not present, then the signal line "DP" is activated into LCD driver 112, and is coupled into digital display 22, to present a decimal point indicator in the digital display 22. The decimal point indicator is placed to the left of the rightmost two decimal digits, thereby permitting the digital display indicator 22 to display its contents in terms of units, and with two decimal places to show hundredths of units. If the "total" signal is present, the "DP" signal is dropped, and the decimal point indicator on digital display 22 is removed. In this case, the digital display 22 displays gallons, without a decimal positioner.

Referring again to FIG. 7, whenever the "reset" key switch is depressed for at least two seconds, the "2 SEC DELAY" circuit 138 becomes activated. The circuit 138 activates an output signal to AND gate 139. AND gate 139 also has a second input from the "reset" signal line, and a third input from the timing divider circuit 53. The third input from the timing divider circuit 53 is a signal which has a repetition rate of 1 hz, and the presence of all three inputs into AND gate 139 causes an output signal which is identified as the "blink" signal. The "blink" signal is coupled to LCD driver circuit 112 to cause the driver circuits to energize and deenergize at a 1 hz rate. This causes the digital display 22 annunciator to blink at the same rate, as has been hereinbefore described.

In operation, the operator must first select the units of measure in which the digital display 22 should be displaying, this is accomplished by depressing the "reset" switch, and holding it down for at least two seconds, and then sequentially depressing and releasing the "total" switch to cause a sequential display of "PTS," "QTS," and "GAL." When the digital display indicates the proper units of measure, the "reset" switch is released. The BCD counter 106 is then cleared of any previously-held count, and the apparatus is ready to begin counting signals from reed switch 42. So long as reed switch 42 becomes activated by the flow of liquid through the device, BCD counter 106 will accumulate a count representative of the units being measured, and BCD counter 108 will accumulate a count which is representative of gallons. If the "reset" switch is depressed at any time more than one second after signals from reed switch 42 are discontinued, the contents BCD counter 106 will become cleared, but the contents of BCD counter 108 will remain intact. The count held in BCD counter 106 can subsequently be restarted, and the contents of BCD counter 108 will continue to accumulate the total count. In this manner, BCD counter 108 serves as a totalizer for all liquid passing through the flow meter, whereas BCD counter 106 may be used to measure intermittent flow through the flow meter.

It is apparent that the invention may readily be converted to provide a measurement and display of flow in other units of measure, as for example, liters. In order to effect this change, all that is necessary is to change the linear length dimension 32b of impeller 32, and to correspondingly change the linear length dimension of stator 34, to provide a flow volume which is incrementally related to the units of measure desired. The only other change required is to select appropriate divider circuits, corresponding to dividers 128, 130 and/or 132, to provide the desired count value corresponding to the unit of measurement selected. Of course, the annunciator display of display 22 should also be selected to correspond with the unit of measurement selected.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A liquid flow meter comprising
   (a) a non-magnetic housing having a liquid inlet and outlet, and an intermediate chamber, connected to permit liquid flow from said inlet through said chamber to said outlet;
   (b) a positive displacement member and non-magnetic shaft rotatably mounted in said chamber, and configured relative to said chamber so as to cause rotation of said displacement member and shaft in direct correspondence with volume flow of liquid through said chamber;
   (c) a permanent magnet diametrically embedded in said non-magnetic shaft, proximate an end thereof;
   (d) a magnetically-operable reed switch mounted outside said housing in close proximity to said shaft end embedding said permanent magnet, said reed switch undergoing two switch closures for each revolution of said shaft;
   (e) a first circuit means for converting said reed switch operations into an electrical numerical representation of liquid flow;
   (f) second circuit means connected to said first circuit means, for counting and totalizing said numerical representations; and
   (g) means for displaying said numerical representations.

2. The apparatus of claim 1, wherein said first circuit means further comprises at least one divider circuit for receiving signals representative of reed switch operations and for producing output signals representative of at least one multiple of said received signals.

3. The apparatus of claim 2, wherein said second circuit means further comprises a first counter for counting and totalizing said first circuit output signals, thereby accumulating a count representative of a first unit of measurement, and a second counter for counting and totalizing said first circuit output signals, thereby accumulating a count representative of a second unit of measurement.

4. The apparatus of claim 3, further comprising a first operator-actuable switch coupled to said first counter, and said means for displaying, to cause the first counter count to be displayed.

5. The apparatus of claim 4, further comprising a second operator-actuable switch coupled to said first counter to cause the first counter count to be reset.

6. The apparatus of claim 2, wherein said at least one divider circuit further comprises a first divider circuit having its output coupled to said first counter, and a second divider circuit having its output coupled to said second counter.

7. The apparatus of claim 2, wherein said at least one divider circuit further comprises a first divider circuit for producing output signals representative of a first multiple of said received signals, and a second divider circuit for producing output signals representative of a second multiple of said received signals, and gating means coupled to said first and second divider circuits for selectively gating said respective output signals to said first counter.

8. The apparatus of claim 7, wherein said at least one divider circuit further comprises a third divider circuit for producing output signals representative of a third multiple of said received signals, said third divider output signals being coupled to said second counter.

9. A liquid flow meter comprising
(a) a first housing adapted for insertion into a liquid flow line, said housing having an inlet and outlet means for serially coupling into said flow line, and a flow-through chamber;
(b) a positive displacement rotational member affixed to a shaft constructed of non-magnetic material, said shaft being bearing-mounted in said first housing with said rotational member interposed in the liquid flow path through said flow-through chamber, whereby liquid volume flow through said chamber causes corresponding positive rotational displacement of said rotational member and said shaft;
(c) a permanent magnet diametrically embedded in said shaft, proximate an end thereof, said reed switch undergoing two switch closures for each revolution of said shaft;
(d) a magnetically-operable reed switch mounted outside said first housing in close proximity to said shaft end embedding said permanent magnet;
(e) first circuit means for converting said reed switch operations into electrical signals;
(f) second circuit means connected to said first circuit means for converting, for counting and totalizing said electrical signals;
(g) means for displaying a numerical representation of said counted and totalized electrical signals;
(h) a second housing outside and attached to said first housing, and a circuit board attached to said second housing, said circuit board having affixed thereto said reed switch, said first circuit means for converting, said second circuit means, and said means for displaying; and
(i) a battery power source contained in said second housing, said battery power source coupled to said reed switch, said first circuit means, said second circuit means, and said means for displaying.

10. The apparatus of claim 9, wherein said second housing further comprises a transparent window aligned with said means for displaying.

11. The apparatus of claim 10, wherein said second circuit means further comprises a first counter for counting and totalizing said electrical signals to form a first count representative of a first unit of measurement, and a second counter for counting and totalizing said electrical signals to form a second count representative of a second unit of measurement.

12. The apparatus of claim 11, further comprising a first operator-actuable switch coupled to said first counter and said means for displaying, to cause the first counter representations to be displayed.

13. The apparatus of claim 12, wherein said first operator-actuable switch is affixed to said second housing.

14. The apparatus of claim 13, further comprising a second operator-actuable switch coupled to said first counter to cause the first counter representations to be reset.

15. The apparatus of claim 14, wherein said second operator-actuable switch is affixed to said second housing.

16. The apparatus of claim 15, wherein said first circuit means further comprises at least one divider circuit for receiving signals representative of reed switch operations and for producing output signals representative of at least one multiple of said received signals.

17. The apparatus of claim 16, wherein said at least one divider circuit further comprises a first divider circuit for producing output signals representative of a first multiple of said received signals, and a second divider circuit for producing output signals representative of a second multiple of said received signals, and gating means coupled to said first and second divider circuits for selectively gating said respective output signals to said first counter.

18. The apparatus of claim 17, wherein said at least one divider circuit further comprises a third divider circuit for producing output signals representative of a third multiple of said received signals, said third divider output signals being coupled to said second counter.

* * * * *